(12) United States Patent
Hinduja

(10) Patent No.: US 11,415,411 B2
(45) Date of Patent: Aug. 16, 2022

(54) METHOD OF MEASURING THE WALL THICKNESS OF AN ARTICLE AND AN APPARATUS FOR MAKING SUCH MEASUREMENTS

(71) Applicant: ELE ADVANCED TECHNOLOGIES LIMITED, Lancashire (GB)

(72) Inventor: Srichand Hinduja, Cheshire (GB)

(73) Assignee: ELE ADVANCED TECHNOLOGIES LIMITED, Lancashire (GB)

( * ) Notice: Subject to any disclaimer, the term of this patent is extended or adjusted under 35 U.S.C. 154(b) by 875 days.

(21) Appl. No.: 16/320,786

(22) PCT Filed: Jul. 13, 2017

(86) PCT No.: PCT/GB2017/052057
§ 371 (c)(1),
(2) Date: Jan. 25, 2019

(87) PCT Pub. No.: WO2018/020215
PCT Pub. Date: Feb. 1, 2018

(65) Prior Publication Data
US 2020/0064127 A1    Feb. 27, 2020

(30) Foreign Application Priority Data

Jul. 25, 2016    (GB) .................................... 1612867

(51) Int. Cl.
*G01B 17/02*    (2006.01)
*G01B 5/008*    (2006.01)
*G01C 3/08*    (2006.01)

(52) U.S. Cl.
CPC ............. *G01B 17/02* (2013.01); *G01B 5/008* (2013.01); *G01C 3/08* (2013.01)

(58) Field of Classification Search
CPC ................................ G01B 17/02; G01B 5/008
(Continued)

(56) References Cited

U.S. PATENT DOCUMENTS 7,809,523 B2 * 10/2010 Hunter ................... G01B 21/04
33/503
8,175,842 B2 * 5/2012 Cameron ............. G05B 19/401
702/167

(Continued)

OTHER PUBLICATIONS

International Search Report issued in International Application No. PCT/GB2017/052057 dated Feb. 2, 2018.

*Primary Examiner* — George B Bennett
(74) *Attorney, Agent, or Firm* — Quinn IP Law

(57) ABSTRACT

A method of (measuring the waif thickness of an article comprising the steps of (a) providing an inspection machine having an inspection machine co-ordinate system associated therewith, the inspection machine comprising a thickness measuring probe; (b) providing an article in a first position relative to the inspection machine; (c) measuring a plurality of surface points on at least a portion of the surface of the article; (d) modelling the at least a portion of the surface of the article from the measured surface points to produce a surface model; (e) generating a probe path from the surface model in an article coordinate system fixed relative to the article; (f) transforming the probe path to the inspection machine co-ordinate system; and, (g) moving the thickness measuring probe along the probe path whilst making a plurality of spaced apart wall thickness measurements of the article.

15 Claims, 5 Drawing Sheets

(58) Field of Classification Search
USPC .......................................................... 33/503
See application file for complete search history.

(56) References Cited

U.S. PATENT DOCUMENTS

| | | | |
|---|---|---|---|
| 8,196,305 B1* | 6/2012 | Hansen | G01B 5/205 |
| | | | 33/530 |
| 11,230,393 B1* | 1/2022 | Guiassa | G01B 21/042 |
| 2009/0165317 A1 | 7/2009 | Little | |
| 2009/0178482 A1 | 7/2009 | Hough et al. | |
| 2010/0207619 A1 | 8/2010 | Wu et al. | |
| 2011/0000300 A1 | 1/2011 | Isobe et al. | |
| 2013/0167647 A1* | 7/2013 | Bailey | G01N 29/0654 |
| | | | 73/632 |
| 2017/0173672 A1* | 6/2017 | Foster | B22C 9/108 |
| 2020/0173936 A1* | 6/2020 | Vöhringer | G01B 11/25 |
| 2020/0182601 A1* | 6/2020 | Beignon | G01B 5/213 |

\* cited by examiner

METHOD OF MEASURING THE WALL THICKNESS OF AN ARTICLE AND AN APPARATUS FOR MAKING SUCH MEASUREMENTS

The present invention relates to a method of measuring the wall thickness of an article. More particularly, but not exclusively, the present invention relates to a method of measuring the wall thickness of an article comprising the steps of measuring a plurality of surface points on at least a portion of the surface of an article, producing a surface model from the surface points, generating a probe path from the surface model, transforming the probe path to an inspection machine coordinate system and then moving the thickness measuring probe of the inspection machine along the probe path whilst making a plurality of spaced apart wall thickness measurements of the article. In a further aspect the present invention relates to an apparatus for performing the method.

It is often desired to measure the wall thickness of an article at several spaced apart points on its surface. An example of this is during the manufacture of a turbine blade. Turbine blades have cooling channels which extend along their length within the body of the blade. These cooling channels are designed to be at optimum positions within the blade to cool the blade during operation but must be, within tolerances, at appropriate distances (the wall thickness) from the surface of the blade to ensure the structural strength and thermal performance of the blade.

Once a turbine blade has been manufactured, the manufacturer is typically required to certify the wall thickness between the surface of the blade and each of the cooling channels within the blade at a plurality of points along the blade length. Each measurement is done by hand with an operator holding an ultrasonic probe at the required point on the surface of the blade to measure the thickness. This is then repeated at each required point. This is a very time-consuming process as often tens of measurements need to be made. It is also prone to human error.

The present invention seeks to overcome the problems of the prior art.

In a first aspect the present invention provides a method of measuring the wall thickness of an article comprising the steps of
(a) providing an inspection machine having an inspection machine co-ordinate system associated therewith, the inspection machine comprising a thickness measuring probe;
(b) providing an article in a first position relative to the inspection machine;
(c) measuring a plurality of surface points on at least a portion of the surface of the article;
(d) modelling the at least a portion of the surface of the article from the measured surface points to produce a surface model;
(e) generating a probe path from the surface model in an article coordinate system fixed relative to the article;
(f) transforming the probe path to the inspection machine co-ordinate system; and,
(g) moving the thickness measuring probe along the probe path whilst making a plurality of spaced apart wall thickness measurements of the article.

The method according to the invention is suitable for automation. A co-ordinate measuring machine can be used to automatically measure a plurality of surface points on at least a portion of the surface of the article. From these points a suitable probe path can be determined. Then, the thickness measuring probe can be automatically moved along the probe path to make the required wall thickness measurements. As the method is automatic this eliminates human error. It increases reliability and speed. It also enables a much larger number of measurements to be made.

Preferably the step of measuring a plurality of surface points is performed by means of a coordinate measuring machine.

Preferably the probe is moved along the probe path such that it is substantially normal to the surface of the article at each point where a wall thickness measurement is made.

Preferably the thickness measuring probe is an ultrasonic probe.

Preferably the first position is a predetermined position with respect to the inspection machine.

Alternatively, a plurality of measurements of the article are made to determine the first position of the article relative to the inspection machine.

Preferably, before the probe path is transformed to the inspection machine co-ordinate system the article is moved to a second position and a plurality of measurements of the article are made to determine the second position of the article relative to the inspection machine.

Preferably the step of moving the article to the second position comprises moving the article to a position where it is immersed in a liquid.

Preferably the thickness measuring probe is, an immersion ultrasonic probe.

Preferably the article is a turbine blade.

Preferably the surface points are measured along a plurality of lines.

Preferably each line corresponds to a cross section of the article.

Preferably the step of modelling at least a portion of the surface of the article to produce a surface model comprises the steps of
(i) numerically fitting a curve to each set of surface points lying on a line; and,
(ii) numerically fitting a surface to the curves to produce the surface model.

In a further aspect the present invention provides an apparatus for measuring the wall thickness of an article comprising
(a) a coordinate measuring machine for measuring a plurality of surface points on the surface of an article;
(b) an inspection machine comprising a thickness measuring probe; and,
(c) a controller connected to the coordinate measuring machine and the inspection machine, the controller being adapted to
  (i) move the coordinate measuring machine to measure a plurality of surface points on at least a portion of the surface of the article;
  (ii) model the at least a portion of the surface of the article from the measured surface points to produce a surface model;
  (iii) generate a probe path from the surface model in an article coordinate system fixed relative to the article;
  (iv) transform the probe path to an inspection machine coordinate system of the inspection machine; and,
  (v) move the thickness measuring probe along the probe path whilst making a plurality of spaced apart thickness measurements of the article.

Preferably the apparatus further comprises a single point laser system connected to the controller, the controller being adapted to receive a plurality of measurements of the article made by the single point laser system and to determine the position of the article with respect to the inspection machine from the plurality of measurements.

The present invention will now be described by way of example only and not in any limitative sense with reference to the accompanying drawings in which FIG. 1 shows an example of an article having a wall thickness to be measured;

Figure 1:
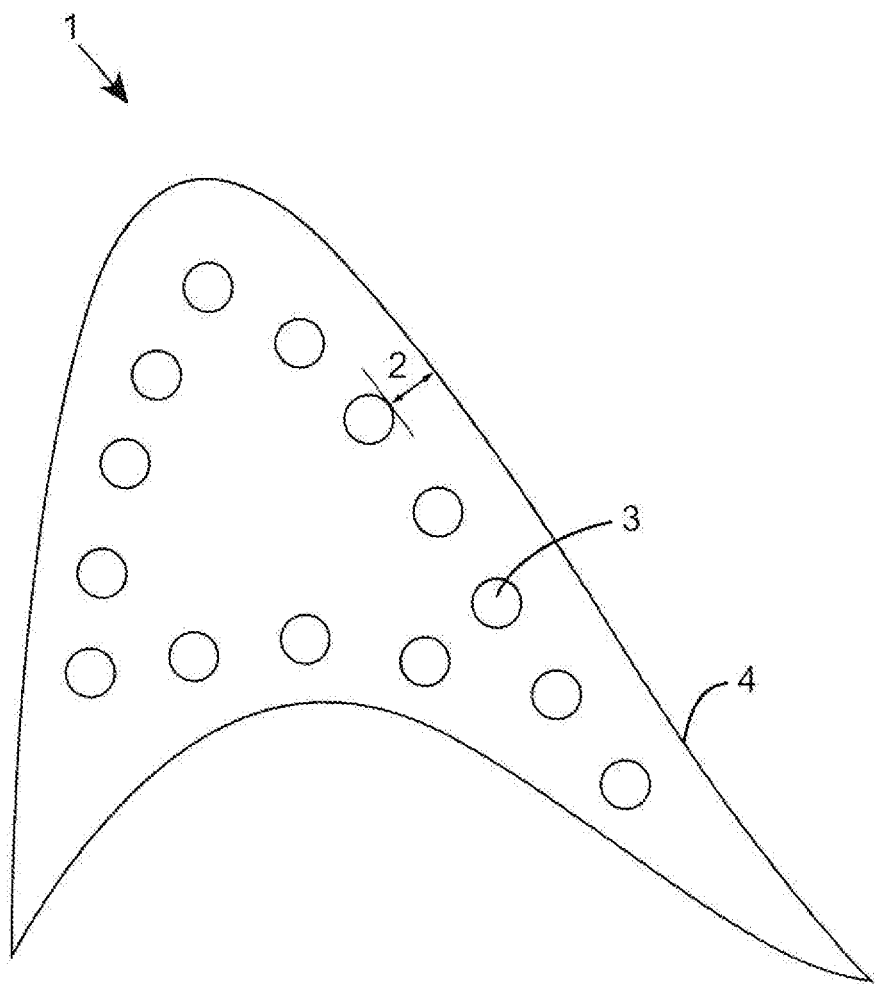

FIG. 1 shows an example of an article 1, in this case being a turbine blade, having a wall thickness 2 to be measured. A vertical cross section of the turbine blade 1 is shown. Extending through the body of the turbine blade 1 is a plurality of cooling channels 3. In use a fluid flows through the cooling channels 3 so cooling the turbine blade 1. Each cooling channel 3 must be a minimum distance, the wall thickness 2, from the surface 4 of the turbine blade 1 to ensure the structural strength of the turbine blade 1.

In a first, step of the method according to the invention an article 1, is provided in a first position. Typically the article is a turbine blade 1 and the method, is described with reference to such a blade. However, the method is not so limited.

Figure 2A:
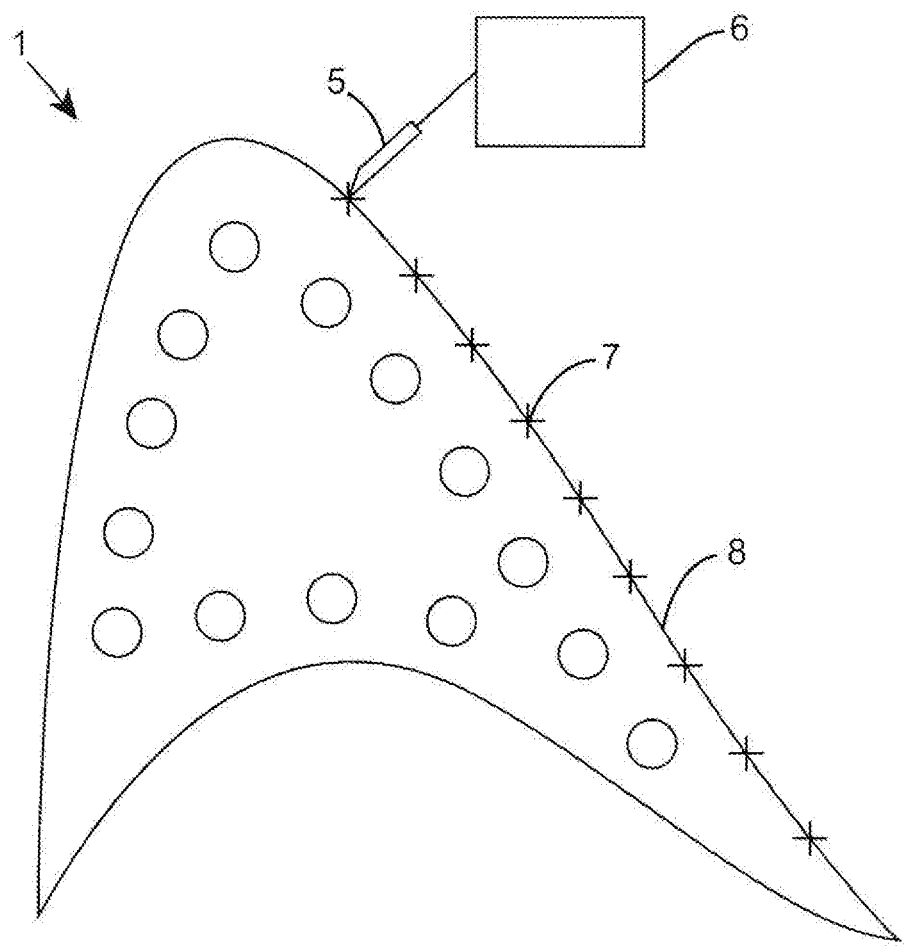
FIG. 2(a) shows a step in the method according to the invention.

The next step of the method according to the invention is shown schematically in FIG. 2(a). In this step the probe 5 of a co-ordinate measuring machine 6 is used to measure the position of a plurality of surface points 7 on a portion of the surface 4 of the turbine blade 1. The surface points 7 are typically measured along a line 8. Typically the line 8 defines a portion of a cross section of the article 1 as shown.

Figure 2B:
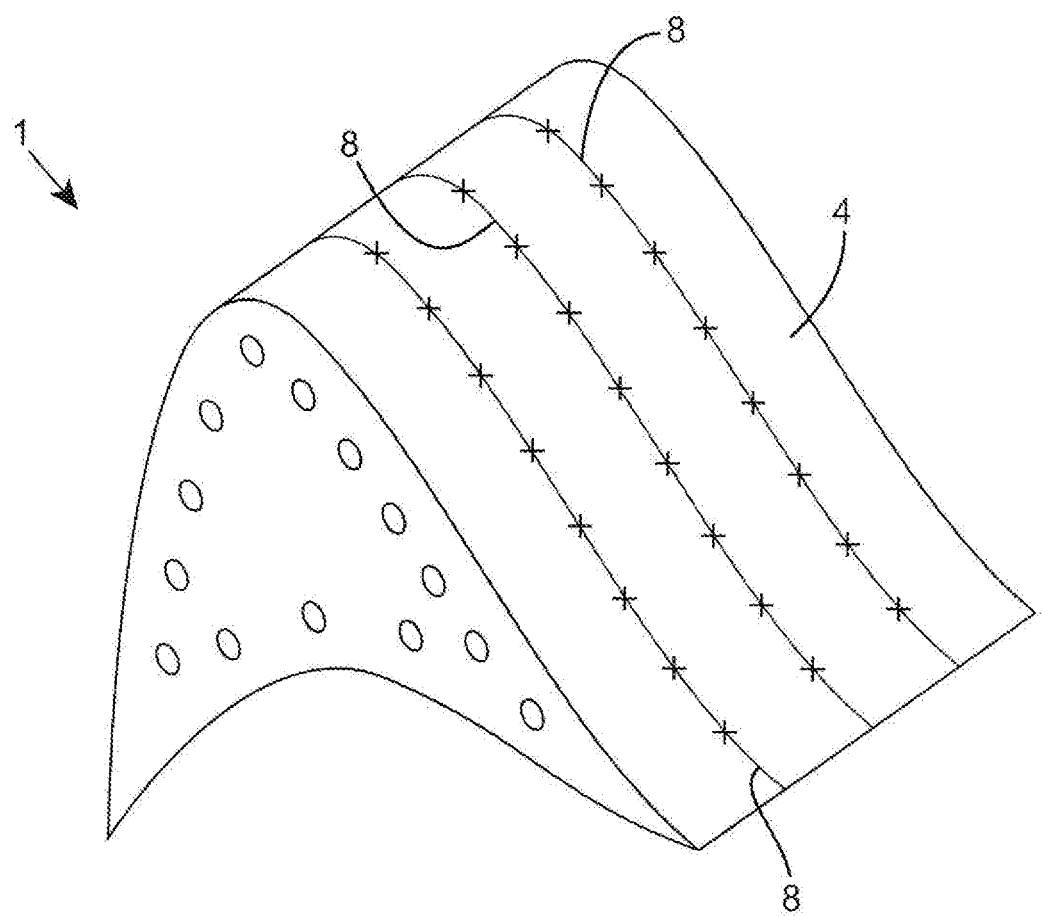
FIG. 2(b) shows a further step of the method according to the invention.

This process is then repeated along a plurality of lines 8 as shown in FIG. 2(b). The surface points 7 together cover a portion of the surface 4 of the turbine blade 1.

In a next step of the method according to the invention the measured surface points 7 are used to model the portion of the surface 4 of the turbine blade 1 to produce a surface model. A number of techniques are known, in the art for converting a plurality of points 7 into a surface model and the method is not limited to any one such technique. In a first modelling step each of the measured surface points 7 along a line 8 is used to fit a curve to represent the line 7. Typically the curve represents a portion of a cross section of the article as shown in FIG. 2(a). A typical curve fitting technique is a B-spline curve fitting technique. Each of the fitted curves is then divided into a large number (typically several hundred) reference points. These reference points are then triangulated to produce a faceted mesh comprising several hundred triangles. From these triangles a B-spline model is generated; this B-spline model is then used to generate a large number of grid points (typically of the order a quarter of a million). These grid points constitute the surface model.

Figure 3:
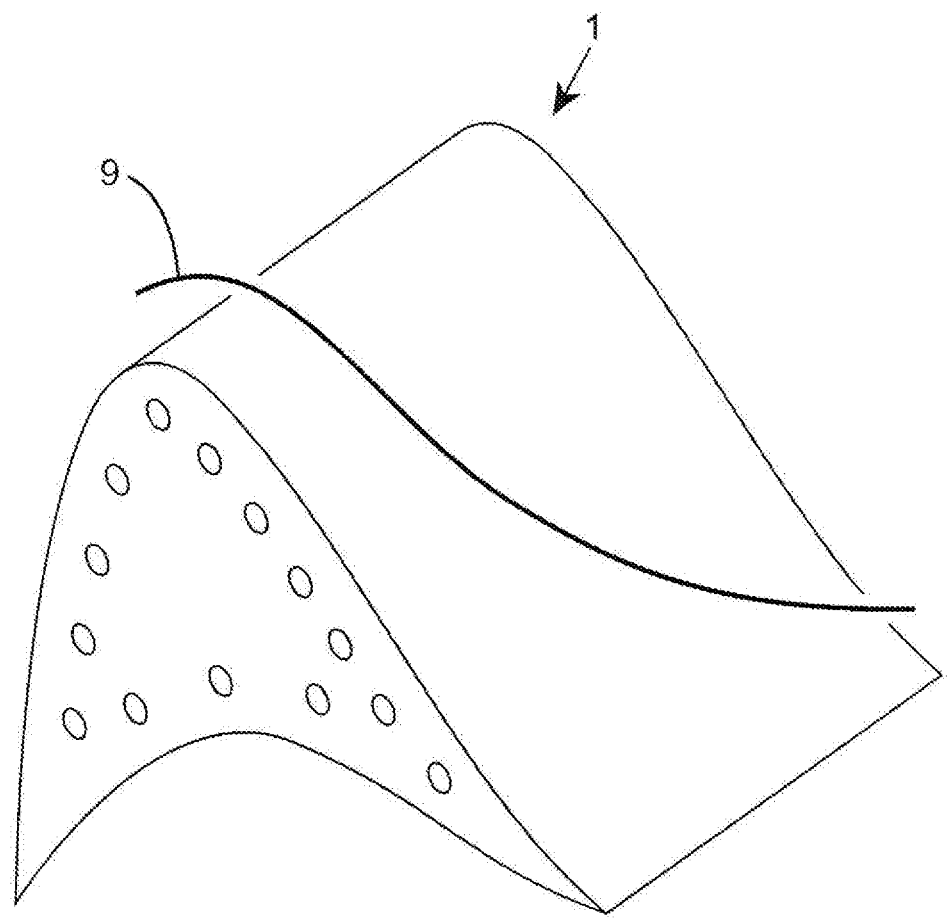
FIG. 3 shows, in schematic form, the probe path generated by the method according to the invention; and, FIG. 4 shows, in schematic form, an apparatus according to the invention.

In the next step a probe path 9 is generated from the surface model. The probe path 9 specifies the path a thickness measuring probe has to follow in the relation to the turbine blade 1 in order to measure the wall thickness 2 of the turbine blade 1 at one or more desired points. The probe path 9 is shown schematically in FIG. 3. The probe path 9 is expressed in a co-ordinate system fixed relative to the turbine blade 1 (the article co-ordinate system). Accordingly, if the position of the turbine blade 1 is changed (either by a lateral translation or by rotation or both) no change to the expression of the probe path 9 is required.

In this embodiment of the invention the first position is predetermined with respect to an inspection machine 10. This is typically achieved by positioning the turbine blade 1 in one or more clamps each in, a known position with respect to the inspection machine 10. Alternatively measurements of the turbine blade 1 may be made to determine the first position of the turbine blade 1 with respect to the inspection machine 10 once the turbine blade 1 is fixed in the first position. Associated with the inspection machine 10 and in known relation thereto is an inspection machine co-ordinate system. In the next step of the method the probe path is transformed from the article co-ordinate system to the inspection machine co-ordinate system.

The inspection machine 10 comprises a thickness measuring probe 11 adapted to measure the wall thickness 2 of the turbine blade 1. Preferably the thickness measuring probe 11 is an ultrasonic probe which measures the reflected sound signals from the two sides of the wall of the turbine blade 1 to measure the wall thickness 2.

In the final step of the method the inspection machine 10 moves the thickness measuring probe 11 along the probe path 9 measuring the wall thickness of the turbine blade at a number of desired points. As is known, an ultrasonic probe makes the most accurate measurements of wall thickness when the probe 11 is substantially normal to the surface 4 of the turbine blade 1 at the point of measurement. Substantially normal typically means within two degrees of normal, more preferably within one degree or normal. Accordingly, the inspection machine 10 moves the thickness measuring probe 11 such that as it moves along the probe path 9 it is normal to the surface 4 of the turbine blade 1. In an alternative embodiment of the invention this requirement is relaxed and the probe 11 is only normal to the surface 4 of the turbine blade 1 at the points where thickness measurements are made. As the probe 11 is moved between these points it may not be normal to the surface 4 of the turbine blade 1.

In a further embodiment of the invention after the surface points 7 have been measured the turbine blade 1 is moved to a second position. Typically when in the second position the turbine blade 1 is immersed in a liquid such as water. In this case the thickness measuring probe 11 is an immersion ultrasonic probe. Once in the second position a plurality of measurements of the turbine blade 1 are made to determine the position and orientation of the turbine blade 1 with respect to the inspection machine. Once the second position of the turbine blade 1 with respect to the inspection machine 10 has been determined the probe path 9 can be transformed from the article co-ordinate system to the inspection machine co-ordinate system as before. The method then proceeds as previously described. In this embodiment it is not necessary that the first position be determined or known relative to the inspection machine.

Typically the measurements to determine the second position of the turbine blade 1 are made by a single point laser 12. The single point laser 12 may measure the distance from the single point laser 12 to a number of reference points on the turbine blade 1. Alternatively it may make measurements of the distance to the points on the surface 4 of the turbine blade 1 previously measured by the co ordinate measuring machine 6. The position of the single point laser 12 with respect to the inspection machine is known and accordingly from these measurements the position of the turbine blade 1 in the second position with respect to the inspection machine 10 can be determined.

Figure 4:
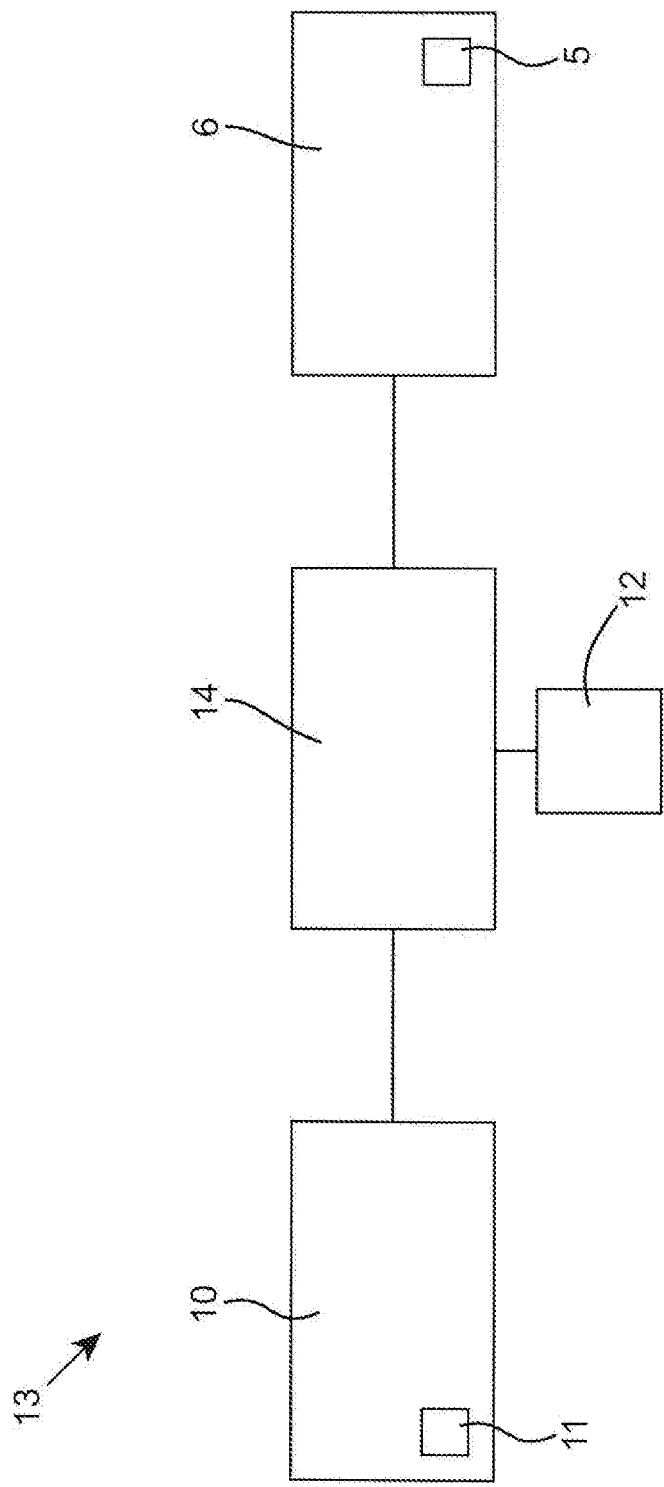

Shown in FIG. 4 is an apparatus 13 for performing the method according to the invention. The apparatus 13 comprises a controller 14 connected to a co-ordinate measuring machine 6 and also to an inspection machine 10. The controller 14 sends instructions to the co-ordinate measuring machine 6 instructing it to measure a plurality of surface points 7 on at least a portion of the surface 4 of the turbine blade 1. The controller 14 receives this data and from this models a portion of the surface of the turbine blade 1 to produce a surface model. It further generates a probe path 9 from the surface model in the coordinate system of the turbine blade 1.

Assuming the Position of the turbine blade 1 with respect to the inspection machine is known the controller 14 then transforms the probe path 9 from the co-ordinate, system of the turbine blade 1 to the co-ordinate system of the inspection machine 10. The controller 14 then instructs the inspection machine 10 to move its thickness measuring probe 11 along the probe path 9 making the required wall thickness measurements as it travels along the probe path 9.

In an alternative embodiment of the apparatus 13 according to the invention the apparatus 13 further comprises a device 12 for measuring the position of the turbine blade 1 with respect to the inspection machine 10. Typically this is a single point laser 12. The single point laser 12 is connected to the controller 14. The position of the single point laser 12 with respect to the inspection machine 10 is known. This embodiment of the apparatus 13 is typically used if the turbine blade 1 is moved from the first position to the second position. Once in the second position the controller 14 instructs, the single point laser 12 to make a plurality of measurements of points on the turbine blade 1. These measurements are then returned to the controller 14. The controller 14 determines the position of the turbine blade 1 from these measurements. The controller 14 is then able to transform the probe path from the article co-ordinate system to the inspection machine co-ordinate system. The device 12 may also be used to determine the position of the turbine blade 1 with respect to the inspection machine 10 when the turbine blade 1 is in the first position if required.

As mentioned above, the method and apparatus have been described mainly with reference to the measurement of the wall thickness of a turbine blade 1. Neither the apparatus 13 nor method are so limited and may be used to measure the wall thickness of other articles 1.

The invention claimed is:

1. A method of measuring the wall thickness of an article comprising the steps of
   (a) providing an inspection machine having an inspection machine co-ordinate system associated therewith, the inspection machine comprising a thickness measuring probe;
   (b) providing an article in a first position relative to the inspection machine;
   (c) measuring a plurality of surface points on at least a portion of the surface of the article;
   (d) modelling the at least a portion of the surface of the article from the measured surface points to produce a surface model;
   (e) generating a probe path from the surface model in an article coordinate system fixed relative to the article;
   (f) transforming the probe path to the inspection machine co-ordinate system; and,
   (g) moving the thickness measuring probe along the probe path whilst making a plurality of spaced apart wall thickness measurements of the article.

2. A method as claimed in claim 1, wherein the step of measuring a plurality of surface points is performed by means of a coordinate measuring machine.

3. A method as claimed in claim 1, wherein the probe is moved along the probe path such that it is substantially normal to the surface of the article at each point where a wall thickness measurement is made.

4. A method as claimed in claim 1, wherein the thickness measuring probe is an ultrasonic probe.

5. A method as claimed in claim 1, wherein the first position is predetermined with respect to the inspection machine.

6. A method as claimed in claim 1, wherein a plurality of measurements of the article are made to determine the first position of the article relative to the inspection machine.

7. A method as claimed in claim 1, wherein before the probe path is transformed to the inspection machine co-ordinate system the article is moved to a second position and a plurality of measurements of the article are made to determine the second position of the article relative to the inspection machine.

8. A method as claimed in claim 7, wherein the step of moving the article to the second position comprises moving the article to a position where it is immersed in a liquid.

9. A method as claimed in claim 8, wherein the thickness measuring probe Is an immersion ultrasonic probe.

10. A method as claimed in claim 1, wherein the article is a turbine blade.

11. A method as claimed in claim 1, wherein the surface points are measured along a plurality of lines.

12. A method as claimed in claim 11, wherein each line corresponds to a cross section of the article.

13. A method as claimed in claim 11, wherein the step of modelling at least a portion of the surface of the article to produce a surface model comprises the steps of
   (i) numerically fitting a curve to each set of surface points lying on a line; and,
   (ii) numerically fitting a surface to the curves to produce the surface model.

14. An apparatus for measuring the wall thickness of an article comprising
   (a) a coordinate measuring machine for measuring a plurality of surface points on the surface of an article;
   (b) an inspection machine comprising a thickness measuring probe; and,
   (c) a controller connected to the coordinate measuring machine and the inspection machine, the controller being adapted to
      (i) move the coordinate measuring machine to measure a plurality of surface points on at least a portion of the surface of the article;
      (ii) model the at least a portion of the surface of the article from the measured surface points to produce a surface model;
      (iii) generate a probe path from the surface model in an article coordinate system fixed relative to the article;
      (iv) transform the probe path to an inspection machine coordinate system of the inspection machine; and,
      (v) move the thickness measuring probe along the probe path whilst making a plurality of spaced apart thickness measurements of the article.

15. An apparatus as claimed in claim 14, further comprising a single point laser system connected to the controller, the controller being adapted to receive a plurality of measurements of the article made by the single point laser system and to determine the position of the article with respect to the inspection machine from the plurality of measurements.

\* \* \* \* \*